May 3, 1938.   R. W. CASE   2,115,841
TESTING APPARATUS FOR AIRCRAFT
Filed Feb. 6, 1936   4 Sheets-Sheet 3

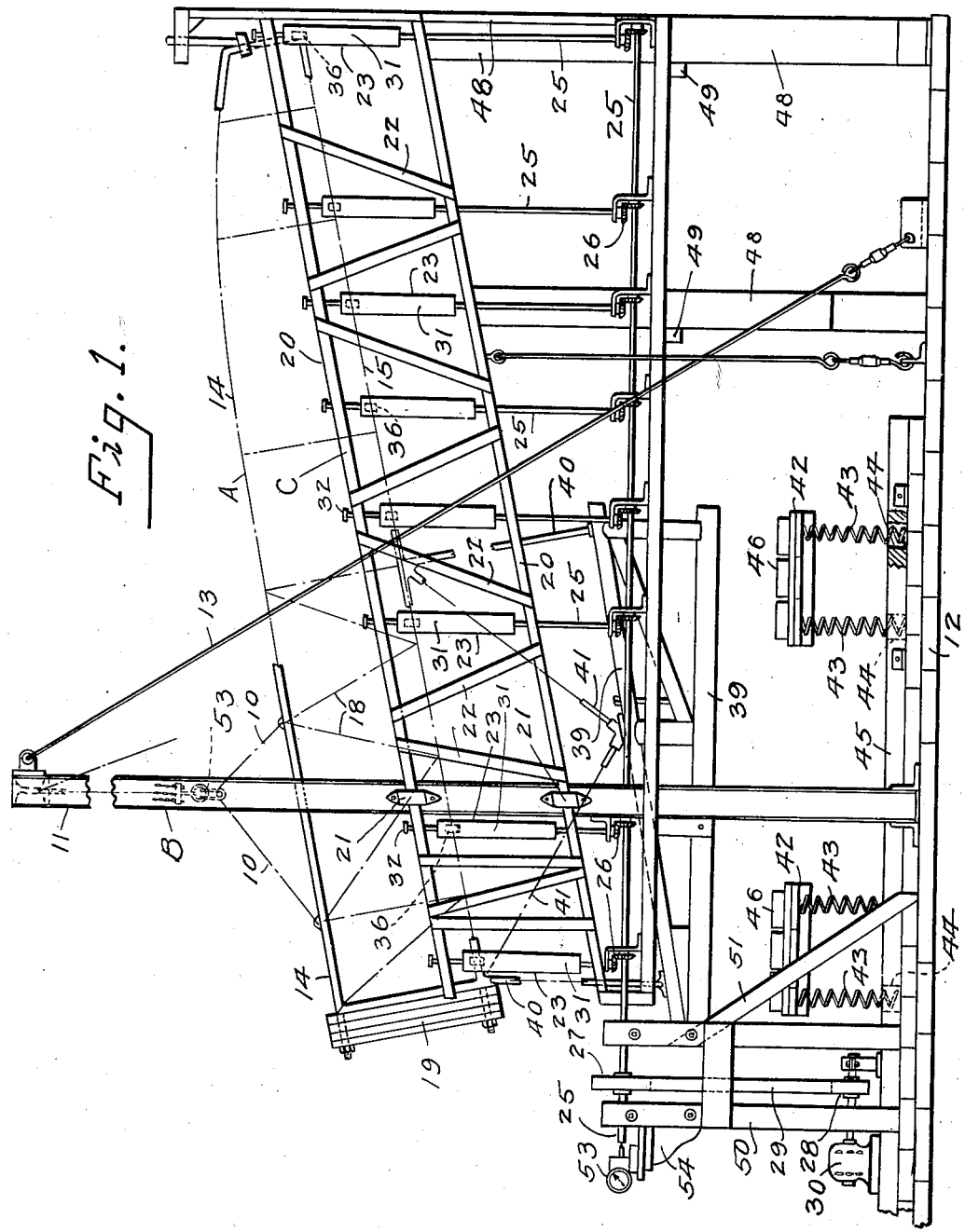

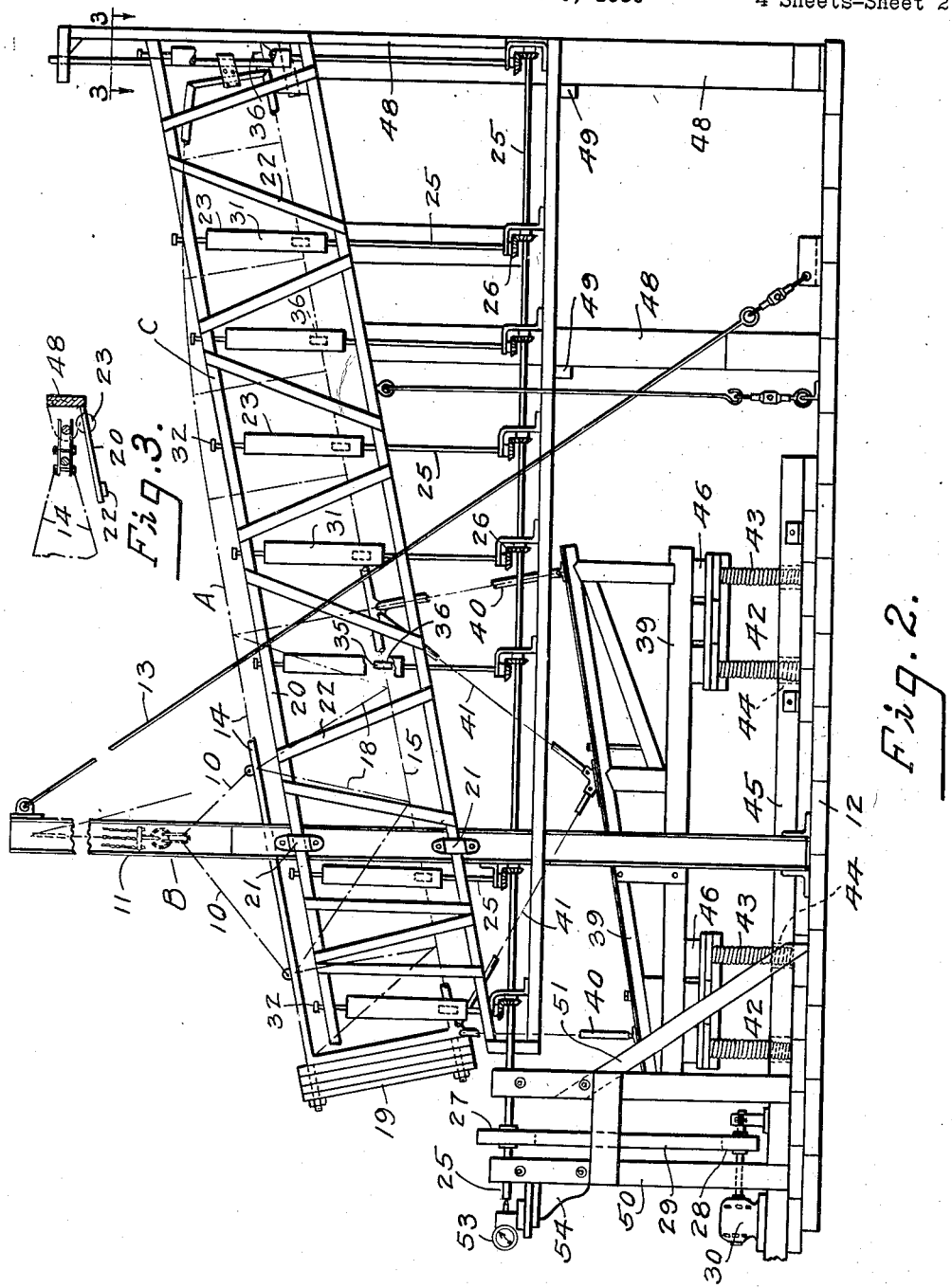

ROBERT W. CASE
INVENTOR
BY
ATTORNEY

May 3, 1938.  R. W. CASE  2,115,841
TESTING APPARATUS FOR AIRCRAFT
Filed Feb. 6, 1936   4 Sheets-Sheet 4
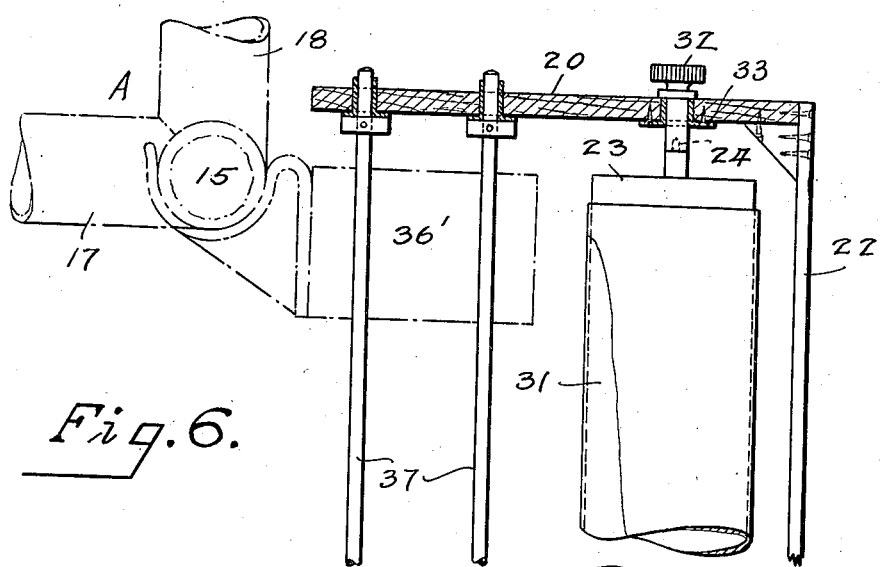
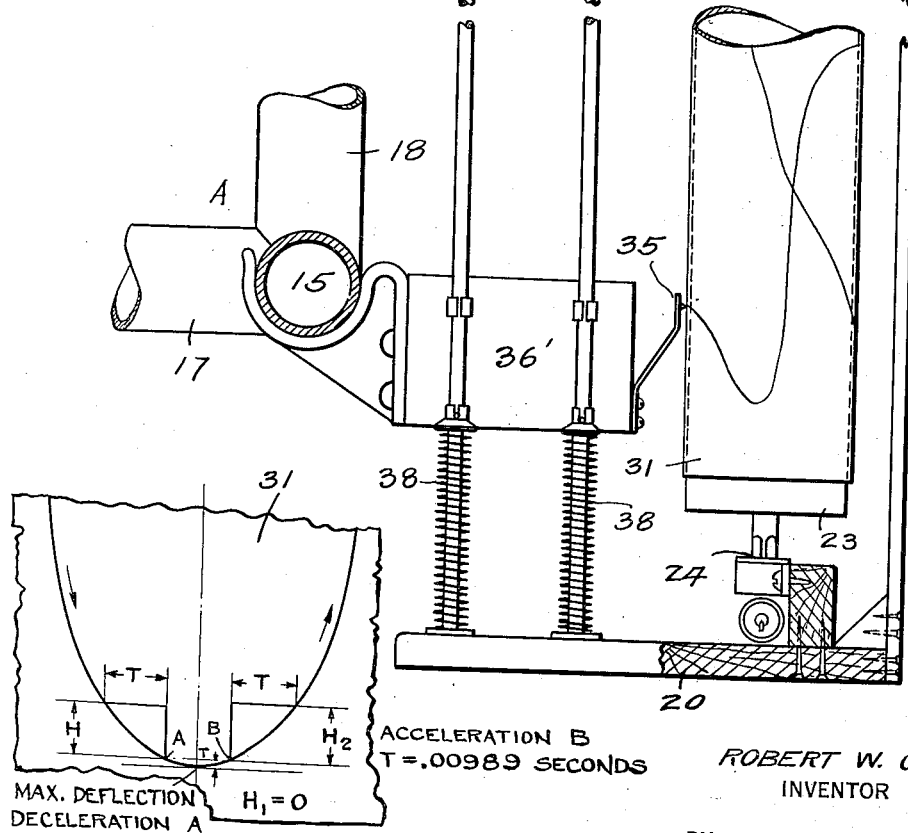
ROBERT W. CASE
INVENTOR Patented May 3, 1938

2,115,841

UNITED STATES PATENT OFFICE 2,115,841

TESTING APPARATUS FOR AIRCRAFT

Robert W. Case, Unionville, Conn.

Application February 6, 1936, Serial No. 62,673

2 Claims. (Cl. 265—2)

My invention relates broadly to testing apparatus for aircraft, and more particularly, to an improved apparatus for determining the safety factor of aircraft which may be derived by impact of the fuselage or any falling mass with respect to time, and graphically recording the results.

An object of my invention is to provide a means for determining the force of impact of an aircraft to simulate the effect of the vertical impact force on landing by drop testing, combined with the horizontal rearward drag force.

With the above and other objects in view, my invention consists in the construction, combination, and arrangement of parts as will be more fully hereinafter set forth as shown by the accompanying drawings and finally pointed out in the appended claims.

Reference is to be had to the accompanying drawings, forming a part of this specification, in which like reference characters indicate corresponding parts throughout the several views, and in which:

Fig. 1 is a side view of a test jig, showing the fuselage frame of an airplane in raised position and ready to be drop tested;

Fig. 2 is a view in side elevation after the fuselage frame has been released and resting upon shock absorbers;

Fig. 3 is a detail horizontal section taken on the line 3—3 of Fig. 2, showing the guides located at the rear end of the fuselage frame;

Fig. 6 is an enlarged view of a slightly modified form of mounting for the stylus for marking of the chart; and Fig. 7 is a fragmentary view of one of the charts showing a reading.

Figure 4:
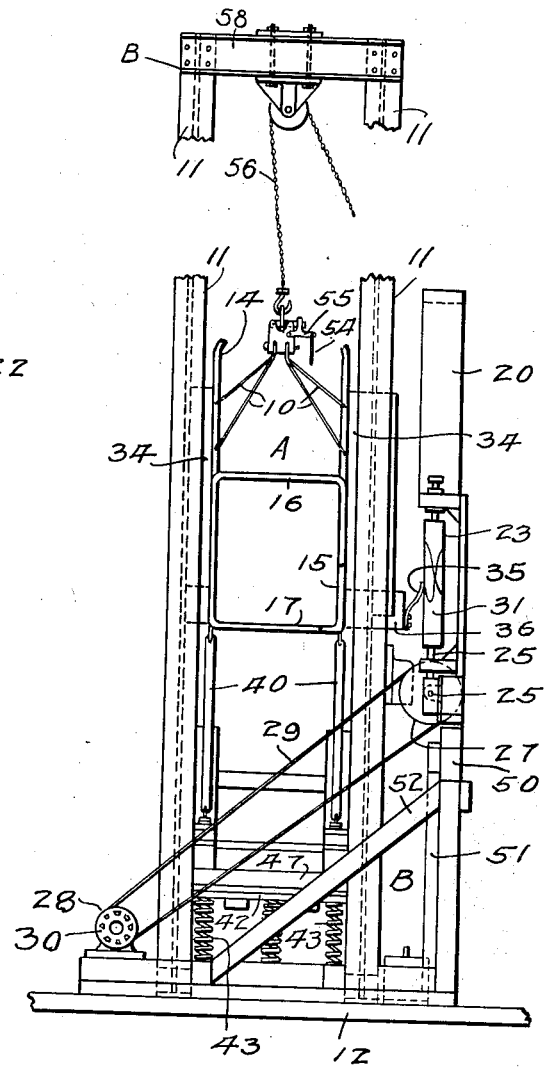
Fig. 4 is a fragmentary front elevational view of the apparatus.

Referring to the drawings, the improved testing apparatus is shown in connection with a conventional airplane fuselage A which includes in its construction upper and lower longerons 14 and 15, respectively, cross bars 16 and 17, and vertical and diagonal struts 18. This frame is provided with weights 19 at its forward end to simulate the weight of the engine and is suspended from a jig B by means of a sling 10. The jig B comprises a pair of vertical guide members 11 supported upon a base 12 and braced by suitable guy wires 13. A superstructure C including upper and lower bars 20 and connecting braces 22 is secured to the side of one of the guides 11 by elements 21 embracing the bars 20. Mounted at intervals along this superstructure are a plurality of recording cylinders 23 of the recording mechanism. The cylinders 23 are mounted in bearings 24 (Fig. 5) supported upon the superstructure 20 at intervals along the entire length of the fuselage and spaced away from the fuselage as shown more clearly in Fig. 4. The cylinders 23 are provided with charts 31 wrapped thereon which charts may be secured thereto in any well known manner. The cylinders are driven at a uniform and constant speed through suitable shafting 25, bevel gears 26, pulleys 27 and 28, and belt 29, from a source of power derived from a small electric motor 30 (Figs. 1, 2, and 4).

Figure 5:
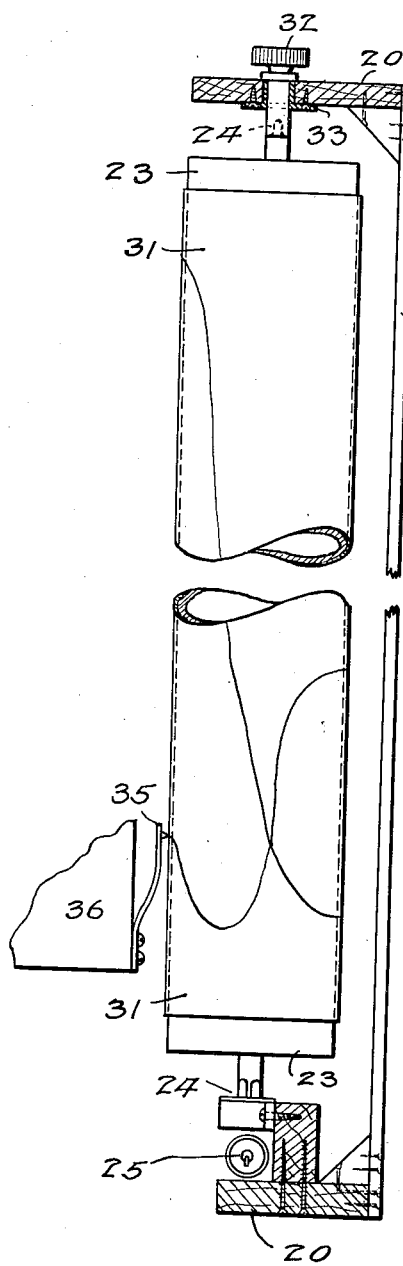
Fig. 5 is an enlarged view of one of the recording units.

Each of the cylinders 23 is detachably mounted upon the superstructure 20 and may be removed for renewal of the charts 31 by means of a knurled stud shaft 32 located at the top member of the superstructure 20 in bearings 33 (Fig. 5).

The vertical guide members 11 are provided with rubbing blocks 34 (Fig. 4) located along their inner sides which form sliding contact with the fuselage frame A and thus restrict the side play to a minimum.

Provision is made for inscribing the charts by locating a series of styluses 35 in engagement with the charts 31. The stylus may be made of phosphor bronze, or the like, with a small prick point punched on the side toward the chart for the reception of a marking fluid or, preferably, the prick point may be made to scratch a waxed surface on the chart attached to the cylinder. The stylus may be mounted as shown in Fig. 5 upon blocks 36 attached directly to the fuselage frame A, or as shown in Fig. 6, wherein the blocks 36' are provided with guides 37 surrounded by shock absorbing springs 38 at their lower ends. The fuselage frame A forces the blocks 36' down when released.

A landing base 39 is provided upon the fuselage frame A, which base is attached by means of main struts 40 and diagonal struts 41. The impact of the fuselage frame A and landing base 39 is damped, when dropped, by engagement with a plurality of buffers 42 (Fig. 4) which are supported upon the coiled springs 43 set in recesses 44 located in a cross tie member 45. These springs 43 are easily removable and may be replaced by springs of greater or lesser strength, as desired, for the various tests. A series of spacer blocks 46 are placed in position upon the top 47 of the buffer 42 which blocks may be quickly replaced by other blocks of different thicknesses according to the range of travel downwardly of the frame A. This prevents the stylus points 35 from passing beyond the lower edge of the chart carried by the cylinders 23.

The superstructure 20 is braced at intervals along its length by vertical supports 48 and cross ties 49. The driving motor 30 and belt 29 connections are supported by means of members 50 which are rigidly held in place by diagonal braces 51 and 52.

A small tachometer 53 or like counter is placed upon a bracket 54 and forced against the end of the shaft 25 to register the revolutions made by the cylinders. This tachometer is used to determine the speed of the cylinders 23 and the charts 31 carried thereby. A hoisting tackle 56 carried by the upper cross bar 58 of the jig B is provided with a trip mechanism 55 (Fig. 4) for engagement with the sling 10 and may be released by means of a cable 54 in order to drop the fuselage A for the purposes described.

The operation of the device and the method of calculation of the results are as follows:

*Test to determined structural weaknesses of an airplane fuselage under impact of a hard landing*

Tests are recorded graphically and the observations of the tests determine the failure characteristics of the various sections of a fuselage. By the use of my testing device, it is possible to test and determine results of placing a load on the fuselage equal to 3.3 times the load factor required in seaplane fuselages with inclined reaction.

The theory is advanced that an acceleration of 26 times the normal acceleration of gravity, that is 26g, applied for 1/100th sec. will impose no greater stress than the lower acceleration of 8g applied over the longer period of 3 minutes.

Conclusion of one test resulted in a conventional fuselage failure at an acceleration equivalent to 3.3 times the load factor of the contemplated design.

A fuselage to be tested was placed in the jig. The bays forward of the rear cockpit were of diagonal tubular bracing of W construction, while those to the rear of the rear cockpit were wire braced.

The jig, as adapted to the fuselage testing, consists essentially of the guides 11 and the shock absorber buffers 42, the autographic recording and driving mechanism including the cylinders 23, hoisting sling 10, and trip hook 53.

A successful operation of the apparatus may be accomplished when the speed of rotation of the cylinders 23 remains at 243 R. P. M. when the record is moving at 50.6 inches per second with a load weight to be dropped amounting to 169 pounds.

The difference between the decelerations at the center of gravity and at the after end of the fuselage will give the whip of the fuselage in a drop above and below the longitudinal axis passing through the center of gravity of the fuselage.

The whip of the fuselage due to the cantilever effect of the after end about the center of gravity created roughly 5.5g less acceleration at the after end than at the center of gravity when 25.6g was measured.

It will be understood that the above description and accompanying drawings comprehend only the general and preferred embodiment of my invention, and that various changes in the construction, proportion, and arrangement of parts may be made within the scope of the appended claims and without sacrificing any of the advantages of my invention.

I claim:

1. In an apparatus for simulating actual landing of an aircraft upon a landing surface and recording the resultant effect of impact and tail whip by drop testing, in combination, a jig, releasable hoisting connections for suspending a fuselage frame from said jig, resilient means located between said frame for damping the impact of said frame upon release from said hoisting connections, a superstructure carried by said jig, a plurality of recording rolls carried by said superstructure at spaced intervals longitudinally of said frame, means for rotating said rolls in unison, and graphic recording means carried by said frame for cooperation with each of said rolls for determining the force of impact of said fuselage frame and the extent of whip of the rear of said fuselage frame, said resilient damping means being also adapted to react after impact to impart a whipping action to said fuselage frame above and below the longitudinal axis passing through the center of gravity of the fuselage for recording by said graphic means on said rolls.

2. In an apparatus for simulating actual nose down plunges of an aircraft upon a landing surface and recording the resultant effect of impact and tail whip by drop testing, in combination, a jig, releasable hoisting connections for suspending a fuselage frame from said jig at an angle to the horizontal, resilient means located between the forward end of said frame damping the impact of said frame upon release from said hoisting connections, a superstructure carried by said jig in a position parallel to the horizontal axis of said fuselage frame, a plurality of recording rolls carried by said superstructure at spaced intervals longitudinally of said frame, means for rotating said rolls in unison, and graphic recording means carried by said frame for cooperation with each of said rolls for determining the force of impact of said fuselage frame and the extent of whip of the rear of said fuselage frame overhanging said resilient damping means, said resilient damping means being also adapted to react after impact to impart a whipping action to said fuselage frame above and below the longitudinal axis passing through the center of gravity of the fuselage for recording by said graphic means on said rolls.

ROBERT W. CASE.